United States Patent
Epps

(10) Patent No.: US 11,779,164 B1
(45) Date of Patent: Oct. 10, 2023

(54) PORTABLE SMOOTHIE MAKER WITH SOLAR PANELS

(71) Applicant: Sabrina Epps, Richmond, VA (US)

(72) Inventor: Sabrina Epps, Richmond, VA (US)

( * ) Notice: Subject to any disclaimer, the term of this patent is extended or adjusted under 35 U.S.C. 154(b) by 0 days.

(21) Appl. No.: 18/097,417

(22) Filed: Jan. 16, 2023

(51) Int. Cl.
| | | |
|---|---|---|
| A47J 43/00 | (2006.01) | |
| A47J 43/08 | (2006.01) | |
| H02S 10/20 | (2014.01) | |
| H02S 10/40 | (2014.01) | |
| H02J 7/00 | (2006.01) | |
| A47J 43/046 | (2006.01) | |
| A47J 43/07 | (2006.01) | |
| H02J 7/35 | (2006.01) | |

(52) U.S. Cl.
CPC ........... *A47J 43/085* (2013.01); *A47J 43/046* (2013.01); *A47J 43/0722* (2013.01); *A47J 43/0727* (2013.01); *H02J 7/0063* (2013.01); *H02J 7/35* (2013.01); *H02S 10/20* (2014.12); *H02S 10/40* (2014.12); *A47J 2203/00* (2013.01)

(58) Field of Classification Search
CPC ........ A47J 43/085; A47J 43/087; A47J 43/09; A47J 43/046; A47J 43/0722
See application file for complete search history.

(56) References Cited

U.S. PATENT DOCUMENTS

| | | | | |
|---|---|---|---|---|
| 6,193,181 B1 * | 2/2001 | Astegno | ............... | A47J 43/0727 241/282.1 |
| 7,270,156 B2 * | 9/2007 | Beesley | ................. | A47J 43/046 366/205 |
| 7,993,054 B2 * | 8/2011 | Wulf | ..................... | A47J 43/046 366/205 |
| 10,362,903 B2 | 7/2019 | Mizrahi | | |
| 11,213,171 B2 | 1/2022 | Faulkner-Edwards et al. | | |
| 2006/0012331 A1 * | 1/2006 | Gillette, II | ............. | A45C 15/00 320/107 |
| 2008/0157711 A1 * | 7/2008 | Chiang | ................... | G11B 33/12 |
| 2008/0303478 A1 * | 12/2008 | Lee | .......................... | A47J 31/00 320/101 |
| 2011/0005560 A1 * | 1/2011 | Nair | ......................... | E04H 15/58 135/117 |
| 2015/0115894 A1 * | 4/2015 | Grepper | ................. | B01F 33/501 320/135 |

(Continued)

FOREIGN PATENT DOCUMENTS

| | | | | | |
|---|---|---|---|---|---|
| CN | 103262262 A | * | 8/2013 | ......... | H01L 31/0521 |
| CN | 108354473 A | * | 8/2018 | .......... | A47J 43/0711 |
| CN | 110165996 A | * | 8/2019 | .......... | A47J 43/0716 |

*Primary Examiner* — Faye Francis
(74) *Attorney, Agent, or Firm* — SANCHELIMA & ASSOCIATES, P.A.; Christian Sanchelima; Jesus Sanchelima

(57) ABSTRACT

A portable smoothie maker with solar panels including a base assembly, a container assembly and a lid assembly. The base assembly includes a hollow base. The base encloses a motor. The base is covered with solar panels. The solar panels power the motor to rotate a blade. The blade is at the top end of the base. The container assembly includes a container. The container is threadably coupled to the top end of the base. The container encloses the blade. The lid assembly includes a lid removable attached to an open top end of the container. Fruits, vegetables and liquids are deposited into the container to make a smoothie by rotating the blade.

1 Claim, 4 Drawing Sheets

(56) References Cited

U.S. PATENT DOCUMENTS

2015/0258514 A1* 9/2015 Boozer .............. A47J 43/0727
366/142
2016/0367072 A1* 12/2016 Boone .................. A47J 43/046
2019/0081493 A1* 3/2019 Thiel .................... H05K 5/0217

* cited by examiner

PORTABLE SMOOTHIE MAKER WITH SOLAR PANELS

BACKGROUND OF THE INVENTION

1. Field of the Invention

The present invention relates to portable blenders and, more particularly, to a portable smoothie maker with solar panels that allows mixing and blending in a portable device solar powered.

2. Description of the Related Art

Several designs for portable blenders have been designed in the past. None of them, however, include a base having solar panels to power the portable blender.

Applicant believes that a related reference corresponds to U.S. Pat. No. 10,362,903 issued for a portable blender which may use rechargeable batteries as a power source. Applicant believes that another related reference corresponds to U.S. Pat. No. 11,213,171 issued for a portable blender apparatus with a rechargeable battery power source. None of these references, however, teach of a portable and solar powered blender that is comprised of a battery powered, portable mixing device with a motor driven mixing blade disposed in the base and a removable mixing container; the device also has a plurality of solar cells disposed around the base of the unit which are used to recharge the built in batteries.

Other documents describing the closest subject matter provide for a number of more or less complicated features that fail to solve the problem in an efficient and economical way. None of these patents suggest the novel features of the present invention.

SUMMARY OF THE INVENTION

It is one of the objects of the present invention to provide a portable smoothie maker with solar panels that includes a battery bank capable of being charged by means of solar panels and powering the smoothie maker.

It is another object of this invention to provide a portable smoothie maker with solar panels that includes a plurality of solar panels disposed in the base of the smoothie maker, the solar panels prevent the need of connecting the portable smoothie maker to the electrical grid.

It is still another object of the present invention to provide a portable smoothie maker with solar panels that includes a container which can be detached from the base to ease serving of a beverage in the container.

It is yet another object of this invention to provide such a device that is inexpensive to implement and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Figure 1:
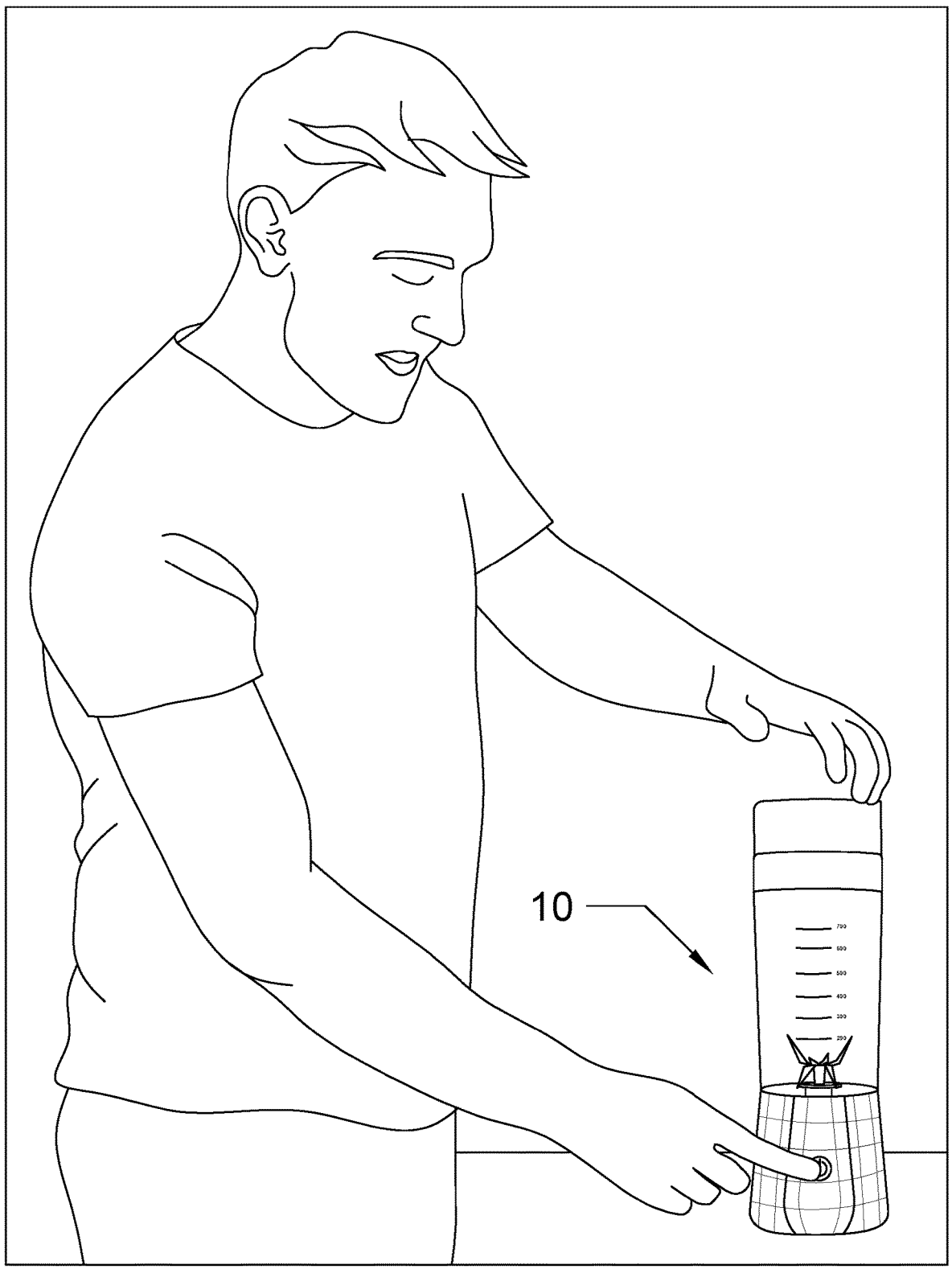
FIG. 1 represents an isometric operational view of the present invention 10.
Figure 2:
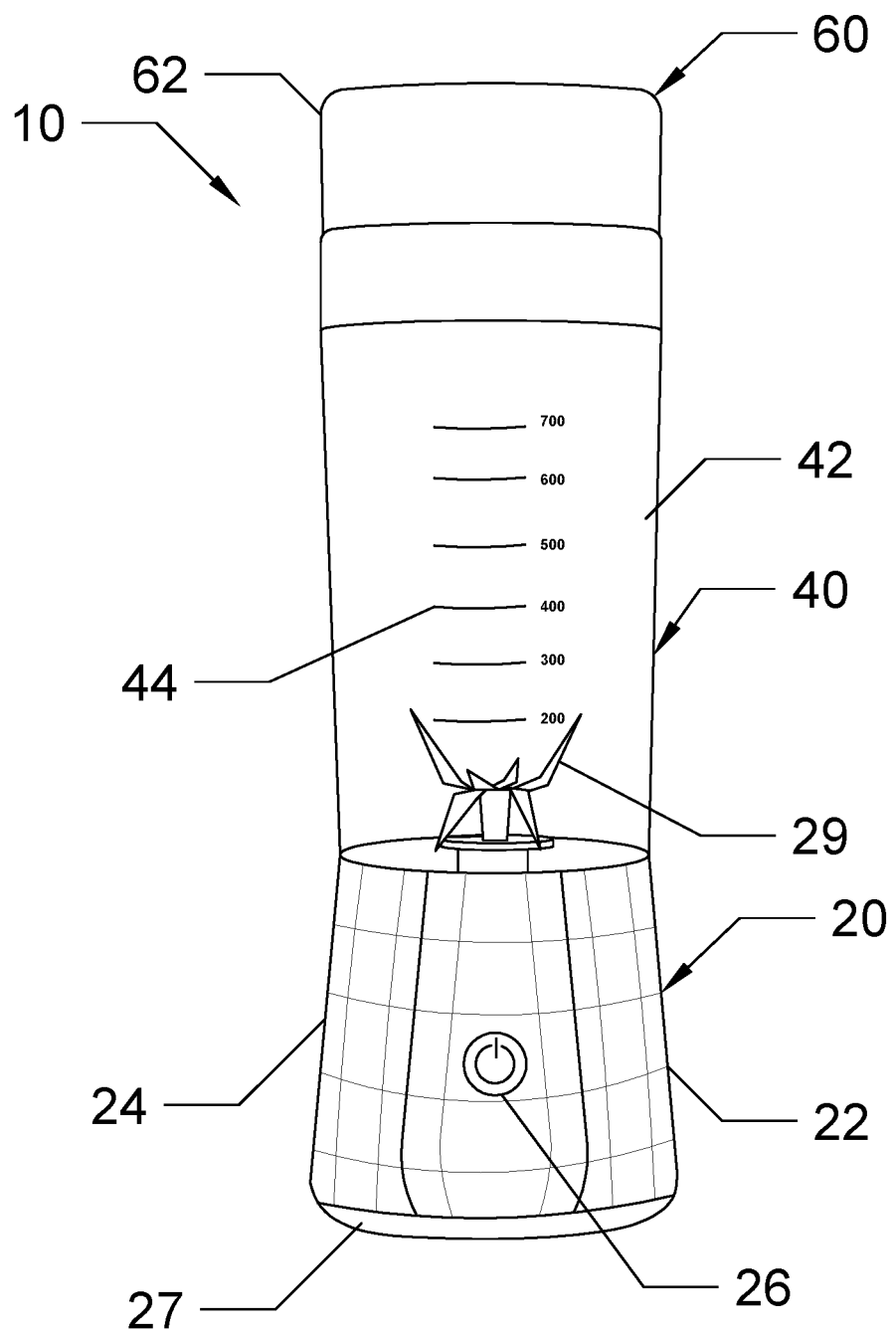
FIG. 2 shows an isometric view of the present invention 10. The present invention 10 includes a base assembly 20, a container assembly 40 and a lid assembly 60.

Referring now to the drawings, where the present invention is generally referred to with numeral 10, it can be observed that it basically includes a base assembly 20, a container assembly 40 and a lid assembly 60. It should be understood there are modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

Figure 4:
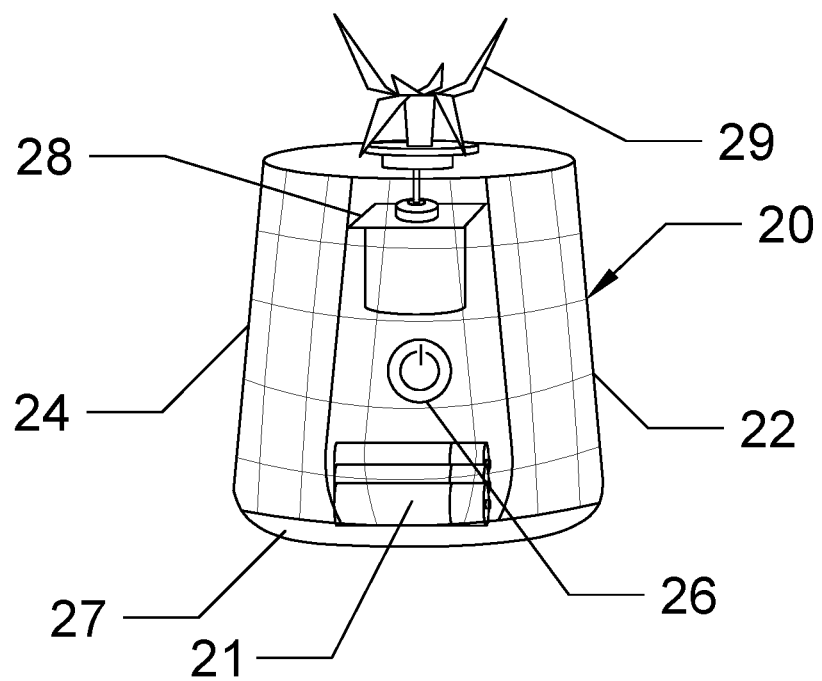
FIG. 4 is a representation of a see-through view of the base assembly 20 showing the motor 28.

As best illustrated in FIG. 4 the base assembly 20 may include a base 24 having blades 29, a motor 28, a button 26, a battery bank 21, charge controller 23, and a bottom lid 27. The base 24 may substantially have a tapered shape with a rounded bottom. It also may be suitable for the base 24 to have a cylindrical shape, a rectangular shape, or any other suitable shape. The base 24 may be made of plastic, metal, or any other suitable material. The base 24 may be hollow. The base 24 may be fully covered by solar panels 22. In a preferred embodiment the solar panels 22 covering the base 24 may be flexible solar panels 22. It also may be suitable for the base 24 to be covered by rigid panels. Flexible solar panels are known in the prior art as panels containing solar cells mounted in a lightweight material placed between layers of protective plastic. The solar panels 22 of the base 24 may preferably be thin-film solar panels. It also may be suitable for the solar panels 22 of the base 24 to be monocrystalline solar panels 22.

The solar panels 22 of the base 24 may be connected to the charge controller 23. The charge controller 23 may be connected to the battery bank 21. The charge controller 23 may limit the rate at which electric current is added to or drawn from battery bank 21. The battery bank 21 may include a plurality of batteries connected therebetween. The solar panels 22 of the base 24 may be a plurality of panels interconnected or a single solar panel which satisfies power requirements of battery bank 21. The battery bank 21 may be connected to the motor 28. The motor 28 may power the blades 29 to rotate. The blades 29 may rotate to mix predetermined materials introduced into container assembly 40. Battery bank 21 may comprise rechargeable batteries. It should be understood that battery bank 21 may be removed from the base 24 to be charged by a battery charger connected to the power outlet. In a preferred embodiment the battery bank 21 may be charged by means of the solar panels 22 covering the base 24. To retire the battery bank 21 or access to the motor 28 the base 24 may have the bottom lid 27 detachable from the bottom of the base 24.

The button 26 may be used to turn on the motor 28. The motor 28 may be powered by means of the battery bank 21.

Figure 3:
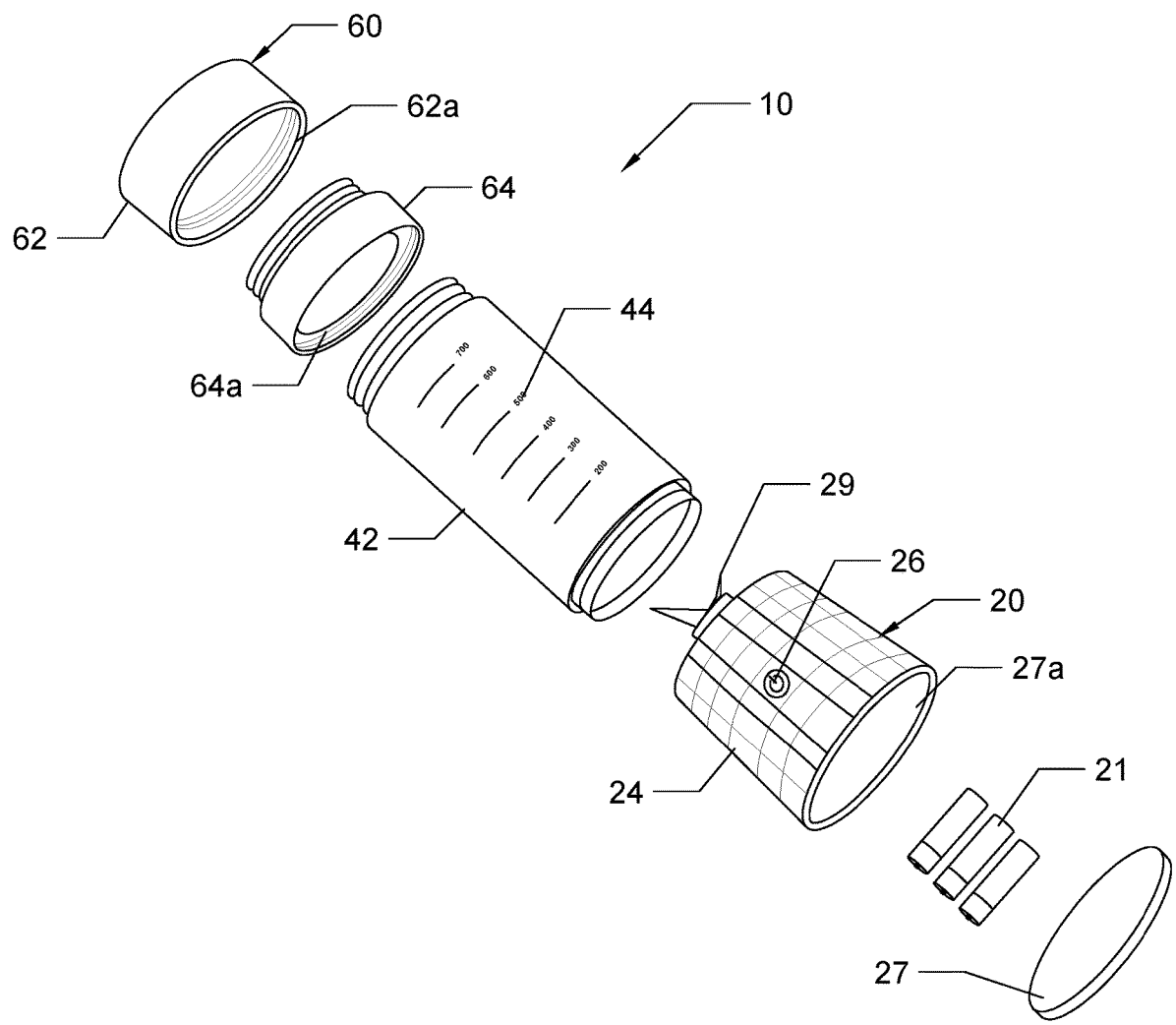
FIG. 3 illustrates an exploded view of the present invention 10.

Referring now to FIG. 3 it can be observed that the container assembly 40 may include a container 42 having indicia 44. The container 42 may be transparent. The container 42 may have a cylindrical shape. It also may be suitable for the container 42 to have a rectangular shape, a triangular shape, or any other suitable shape. The container 42 may be made of plastic, or any other suitable material. The container 42 may have a top threaded end and a bottom threaded end. The top threaded end may be coupled to the lid assembly 60. The bottom threaded end may be coupled to the base top of the base 24. The top of the base 24 may be adapted to receive the bottom end of the container 42. The container 42 may be hollow. The container 42 may contain the blades 29 therein. The indicia 44 may indicate a volume percentage in the container depending on the height thereof.

The lid assembly 60 may include a sealing element 64 and a lid 62. The lid 62 and the sealing element 64 may be made of plastic. It also may be suitable for the lid 62 and the sealing element 64 to be made of metal, or any other suitable material. The lid 62 may have sidewalls and a top wall. The sealing element 64 may have sidewalls. The sidewalls of the sealing element 64 may include a rubber-like sealing to prevent leaking of substances from the container 42. The lid 42 may be threadably connected to the sealing element 64 and the sealing element 64 may be threadably coupled to the top threaded end of the container 42.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A portable smoothie maker with solar panels, consisting of:
    a base assembly, wherein said base includes a base, said base is covered by solar panels, said base is hollow, said base encloses a motor, a charge controller and a battery bank, said battery bank is a rechargeable battery bank, said battery bank is operatively connected to said solar panels, said solar panels power said battery bank, said battery bank is connected to said motor, said motor is powered by means of said battery bank, said charge controller is connected to said solar panels and said battery bank to limit the rate at which electric current is added to or drawn from said battery bank, said motor is operatively connected to a blade, said motor actuates said blade to rotate;
    a container assembly, wherein said container assembly includes a container, said container is coupled to a top threaded end of said base, said container encloses said blade, said blade is configured to rotate to mix and blend fruits, vegetables and liquids, said container is transparent, said container has a cylindrical shape, said container includes indicia to indicate a volume percentage of said container; and
    a lid assembly, wherein said lid assembly includes a lid and a sealing element, said lid is removable attached to a top end of said container, said sealing element is placed between said top end of said container and a bottom end of said lid.

* * * * *